United States Patent Office 2,953,477
Patented Sept. 20, 1960

2,953,477

BIAS-CUT WOVEN GLASS FABRIC SIZED WITH A RESINOUS MATERIAL

Walter W. Evans, East Kingston, N.H., assignor to Exeter Manufacturing Company, Exeter, N.H., a corporation of New Hampshire No Drawing. Filed Aug. 7, 1956, Ser. No. 602,515

1 Claim. (Cl. 117—126)

This invention relates to glass fabric suitable for use in electrical insulation exposed to higher temperatures than cellulosic insulation will stand and pertains more specifically to bias-cut glass fabric having a sizing which bonds the yarns of the fabric together at their intersections and which is useful in the manufacture of varnished or coated glass fabric insulation.

It has hitherto been proposed to employ glass fabric as electrical insulation. However, the use of this material in the forms which it has hitherto been available has been subject to various limitations imposed by the inherent properties of the fabric. Square woven glass fabric, whether made from yarns spun from continuous fibers or from staple fibers, has a very low extensibility because of the inherent low elongation of the individual fibers together with the lack of any crimp in the fibers. Accordingly, when such fabric has been employed for electrical insulating purposes, it has been difficult or impossible to make the fabric conform to the shape of an irregular object, even by applying the fabric under considerable tension in the direction of either the warp or the weft.

When tension is applied to such fabric along the bias it does display satisfactory elongation by reason of relative angular displacement of the warp and weft yarns with concomitant reduction in width of the fabric (transverse to the direction of tension). However, such a fabric, even when carrying a conventional sizing material such as starch, when subjected to even a slight amount of tension on the bias, is very readily extended and lacks the property of elastic recovery, presumably because the extremely smooth surfaces of the fibers composing the yarns slide over each other with very little frictional drag and lack the inherent elasticity required to restore them to their original condition.

In the case of short lengths of bias-cut glass fabric, ease of elongation and lack of elastic recovery, while undesirable, is not necessarily a fatal defect because such short lengths are not subjected to any substantial tension along the bias until after they have been varnished or coated and dried. However, in the case of very long or substantially continuous lengths of bias-cut glass fabric (the length of which is limited only by the size of the packages which may conveniently be shipped), tension does become an important factor, particularly since insulating varnish and other coating materials, especially silicones, as conventionally applied, require drawing the fabric through drying ovens or vertical drying towers to set the varnish or other coating materials, a step involving tensions of the order of 1 to 3 lb. per inch width applied along the bias of the fabric at elevated temperatures.

It has now been discovered that by employing the sizing materials of the present invention to bond the yarns of the fabric together at their intersections it is possible to provide a fabric which possesses sufficient resistance to elongation under moderate tension to enable it to be varnished or coated in the conventional manner without excessive pull-down or reduction in width. Furthermore, the bonding materials of the present invention are compatible with the varnish or other coating subsequently applied, providing good adhesion thereto. In the case of products made by varnishing the bonded fabric of the present invention the elongation of the dried varnish itself is no greater than that of the bonding material so that the presence of the latter has no deleterious effect upon the extensibility characteristics of the product. In the case of products made by coating with a silicone rubber, the product may be subjected to a stress sufficiently great to rupture the bonding or sizing material, after which the extensibility of the product will be limited only by the extensibility of the silicon rubber.

The woven glass fabric of the present invention, which in the preferred aspect of the invention takes the form of a long, substantially continuous strip of fabric cut on the bias, may be varnished or coated in the same manner as conventional cotton fabric, the varnish or coating being applied by an immersion or padding step, then dried at elevated temperatures of the order of 200° to 400° F., usually 275° to 350° F. The varnish or coating may be applied in a single step or as a succession of separate steps (usually 3 to 5) to build up the desired thickness, the completed varnished or coated fabric having a thickness from 150% to 300% of the thickness of the fabric before varnishing. The fabric ordinarily has a thickness of about 4 mils before varnishing or coating and from 7 to 12 mils after varnishing or coating.

The sized glass fabric of the present invention is capable of withstanding a pull of 1 lb. per inch on the bias at an angle of 45° to the yarns at a temperature even up to 400° F., the temperature at which the varnish or coating is dried, or a pull of 3 lbs. per inch at room temperature with a decrease in width (measured transversely of the direction of pull) of less than 3%, so that the fabric retains its dimensional stability throughout the varnishing or coating operation. The sized fabric, however, possesses sufficient extensibility (before varnishing or coating) so that it has an elongation from 0.5% to 20% when subjected to a pull or tension of 3 lbs. per inch on the bias (at an angle of 45° to the yarns) for thirty minutes at room temperature. Even following the application of varnish it has an elongation from 1% to 20% when subjected to a pull of 5 lbs. per inch on the bias for thirty minutes at room temperature. This extensibility of the varnished glass fabric is substantially the same as the extensibility of varnished cotton fabric which has hitherto been employed for electrical insulating purposes at lower temperatures. In the case where the product is coated with silicone rubber instead of varnish it is characterized, following rupture of the bonding or sizing material by stress, by an elongation similar to that of silicone rubber alone, that is from 1 to 20% immediately upon subjection to a pull of 5 lbs. per inch; it is also characterised by substantially complete elastic recovery immediately upon release of the pull.

The extensibility and elastic recovery of the fabric of the present invention (prior to varnishing or coating) is provided by the elasticity of the sizing material which bonds the yarns together as distinct from the extensibility of cotton fabric in which this property is provided by the inherent elasticity of the cotton yarns themselves which is due in part at least to the crimped and twisted nature of the individual cotton fibers and their ability to elongate under stress and to recover from such stress.

Bias-cut woven glass fabric which has a conventional sizing material such as starch, as pointed out above, possesses insufficient strength or resistance to shifting of the yarns to permit it to be varnished under conventional conditions. Such a fabric, when subjected to the relatively small degree of tension required to pull it through the varnish-drying towers, will display a reduction in width (measured transversely to the direction of pull) up to 20% or 40% or even more. Inasmuch as the varnishing operation does not materially change the extensibility of the fabric, the finished product will not be satisfactory for use as insulating material. In addition, because of the shift in angular disposition of the yarns, the density of the fabric is appreciably changed and the weight of varnish which may be applied will be excessively reduced.

In order to achieve the desired high dielectric strength in the finished product to render it useful for electrical insulating purposes, it is essential that the sizing material employed be substantially free from electrolytes or other electroconductive material, whether the product be intended for use as Class B or as Class H insulation. It will be appreciated that cotton fabric, no matter how it is treated or with what it is varnished or coated, is incapable of use as either Class B or Class H insulation because of its lack of thermal stability.

In the case of products intended for use as Class B insulation, the woven glass fabric does not require any cleaning operation but may simply be coated or impregnated with the sizing material which preferably comprises polyvinyl alcohol in combination with a hardening agent. Among the hardening agents which may be employed are maleic anhydride as well as maleic anhydride interpolymers with vinyl compounds such as an interpolymer of maleic anhydride with styrene or with methyl vinyl ether and the like. It is believed that the hardening agents are effective in raising the softening point of the polyvinyl alcohol by virtue of a chemical reaction therewith, such as cross-bonding or condensation with the polyvinyl alcohol. However, I do not wish to be bound by this theory. If desired, any of the conventional high dielectric strength fillers may also be employed. The hardening agent may be employed in a wide range of proportions, from about 5% of the weight of the polyvinyl alcohol to 300% by weight or even more, but preferably in the proportions of 10% to 100% by weight. The weight of the filler when present, may vary from 10% of the weight of the polyvinyl alcohol to 50% by weight. The product may be varnished with any conventional organic insulating varnish in the conventional manner to provide bias tape suitable for use as Class B insulation.

When it is desired to provide Class H insulation it is essential that the glass fabric be free from organic materials. Inasmuch as starch or a starch-oil mixture is required as a lubricant during the spinning of yarns from glass filaments as well as during the weaving of fabric from the yarn, it is necessary that this organic material be removed to provide clean cloth prior to coating or impregnating the fabric with the sizing material of the present invention. Heating the woven fabric in an oven at 650° F. for 80 hours will suffice to remove such organic material. The sizing material employed for such Class H insulation must itself be free from organic material and is preferably a silicone compound such as a methylpolysiloxane which acts as a solid adhesive on the glass. These silicone adhesives, in the finished sized fabric of the present invention, are in polymeric form. In addition, high dielectric strength fillers may be employed if desired. The product, in which the yarns of the bias cut fabric are bonded together at their intersections with the silicone, cannot be varnished with an organic varnish if it is to be used as Class H insulation. Instead a silicone varnish must be employed, or if a highly elastic product is desired a silicone rubber may be coated on the product instead of the varnish.

In any event, whether the polyvinyl alcohol composition or the silicone be employed as the sizing material, the strength and the softening point of the dry sizing composition in place upon the fabric must be such that the fabric (prior to varnishing or coating), when subjected to a pull of 3 lb. per inch at room temperature or a pull of 1 lb. per inch at 300° F. at an angle of 45° to the yarns, undergoes a reduction in width (transverse to the direction of pull) less than 3%. The test may conveniently be made on a strip of fabric one inch wide cut on the bias at an angle of 45° to the yarns, although a strip of any other convenient width may be employed.

The sizing material is preferably employed in the form of an aqueous solution or dispersion, although liquid media other than water may be employed if desired. Volatile organic solvents, of course, have the disadvantage of high cost and of possible fire hazard. The concentration of sizing material in the liquid medium may be varied over a wide range, from 2% or 3% by weight up to 40% or 50% or even more, preferably 10% to 40% by weight, the solids pickup of the fabric varying, of course, with viscosity and total solids content of the sizing composition and with construction of the glass fabric. In general, the weight of the solid sizing material on the fabric will vary from 3% to 20% by weight of the fabric. Best results have been obtained when the weight of the sizing material is from 5% to 15% by weight of the fabric. The fabric may be dried, after application of the sizing material, at any desired temperature, even as low as room temperature. In order to accelerate drying it is usually carried out at temperatures upwards of 212° F., preferably from about 250° F. to about 400° F. In the case of heat curable sizing materials, such as the silicone sizings, the curing step may be carried out by heating the impregnated glass cloth at temperatures of about 250°–400° F. for one to ten minutes.

The bias-cut woven glass fabric of the present invention is preferably prepared by weaving the fabric in the form of a continuous tube or cylinder from glass yarns which may be composed of continuous glass filaments or of staple glass fibers, preferably the former. The tube then has the sizing material applied to it in any suitable manner, as for example in a conventional padding operation. Following a drying step, the tube is slit helically to provide a continuous length of bias-cut fabric. The tube is preferably dried and slit while its tubular shape is maintained, although reasonably good results may be obtained by drying the tube while in flattened condition provided that care is taken not to crease the margins too sharply. The slit may be made at any desired angle to the yarns, as for example, at a 30°–60° angle; generally, a slit at an angle of 45° has been found satisfactory. Apparatus suitable for carrying out these operations is described in copending application Serial No. 364,383, filed June 26, 1953, now U.S. Patent No. 2,879,581, issued March 31, 1959. Although it is preferable to apply all of the sizing material required in a single operation, it may be desirable in some cases to apply the sizing in two steps, in which case a portion of the sizing material may be applied to the tube before the slitting operation and the remainder may be applied following the slitting operation and prior to varnishing or coating.

The continuous length of bias-cut glass fabric may be further slit into a plurality of narrow tapes ranging in width from ½ inch upwards or it may be supplied in the form of a wide sheet (approximately 40 inches wide) as it appears immediately after the first slitting of the woven glass tube. In either event the bias-cut fabric having the sizing material which bonds the yarns together at their intersections possesses the required properties of strength and elasticity for proper application of conventional insulating varnish or coating or silicone varnish or rubber.

In order to describe my invention more fully, but without any intention of limiting it, the following specific examples are given.

*Example 1*

An aqueous solution containing 7.5% by weight of polyvinyl alcohol (Elvanol grade 51–05) was prepared and to this was added an equal volume of an aqueous dispersion containing 7.5% by weight of a copolymer of maleic anhydride with styrene (Bakelite SYHN). This composition was applied by a padding operation to a continuous tube woven (60-58) from glass yarn spun from continuous filaments. The total solids deposited on the yarn was about 8%. The coated fabric was dried at a temperature of 250° to 300° F. and the tubing was slit helically to provide a strip of bias-cut woven glass fabric approximately 39 inches wide, the yarns making an angle of about 45° with the edge of the fabric.

When subjected to a pull of 1 lb. per inch along the bias at 300° F. or a pull of 3 lb. per inch along the bias at room temperature, this fabric underwent a reduction of width (in a direction transverse to the direction of pull) of less than 1½% indicating that the yarns were firmly bonded together by the sizing material and exhibited substantially greater elastic recovery properties than similar fabric provided with conventional starch sizing. When subjected to a pull of 3 lb. per inch along the bias for thirty minutes at room temperature it exhibited an elongation of 0.75% to 1.0%.

This fabric, having a thickness of about 4 mils, was coated with a conventional organic insulating varnish of the type used for application to cotton fabric and dried at a temperature of 300° to 350° F. in conventional drying towers, the finished fabric having a thickness of approximately 7 mils.

The dielectric strength of the varnished fabric was measured by the conventional puncture test, the fabric exhibiting a dielectric strength greater than 800 volts per mil of thickness. The elongation of the finished product was approximately 1.75%–1.87% when subjected to a pull of 5 lb. per inch along the bias for thirty minutes at room temperature. This degree of extensibility of the varnished fabric made it completely acceptable as Class B insulating material, the fabric conforming to irregular shapes in excellent fashion, since even when elongated 6% along the bias the dielectric strength of the material was more than 300 volts per mil thickness.

*Example 2*

An aqueous solution containing 10% of the same polyvinyl alcohol as described in Example 1 was prepared and with this solution was mixed an equal volume of a 5% aqueous dispersion of a copolymer of maleic anhydride with methyl vinyl ether. This sizing material was applied to a glass fabric as described in Example 1 and dried at a temperature of 250° to 300° F. The finished fabric had substantially the same properties as described in Example 1, both before and after varnishing.

*Example 3*

An aqueous solution was prepared containing 50% by weight of the reaction product of a lower polyhydric alcohol with a methylalkoxysilane, sold by General Electric Co. as silicone product 81543, and the pH of the solution was adjusted to a value between 4.4 and 4.7 by the addition of acetic acid.

The foregoing solution was applied to glass fabric tubing, dried, and the glass fabric tubing was split helically as described in Example 1. The coated bias-cut fabric strip was then heated at 250°–300° F. for approximately two minutes to decompose the silicone product with the liberation of polyhydric alcohol and the formation of a methylpolysiloxane serving to adhere or bond the yarns elastically together at their intersections. It will be understood that varying concentrations of the silicone material in an aqueous medium, from 25% by weight up to solutions saturated at operating temperatures, may be employed, if desired. Also, the pH of the solution may be varied more widely, from pH 3 to pH 7 or even higher, although an acid solution is preferred. The finished fabric possessed substantially the same properties as that of Example 1, both before and after varnishing with conventional organic varnish, fully meeting the specifications for Class B insulating material.

*Example 4*

Woven glass fabric tubing was treated with a conventional aqueous starch composition and dried in order to provide the fabric with body and stiffness and to facilitate the subsequent slitting operation. It was then slit helically to provide a strip of bias-cut woven glass fabric with the yarns making an angle of about 45° with the edge of the fabric. The strip was wound on a supporting tube or mandrel and heated in an oven at 650° F. for approximately 80 hours to provide fabric free from organic material.

The clean bias cut fabric was then passed through an aqueous solution of silicone product 81543, dried and heated as described in Example 3 above.

The fabric had substantially the same properties as that of Example 3 but in addition, since it was free from organic material, it met the specifications for Class H insulating material when varnished with a conventional silicone varnish such as Dow Corning 996 or 997 varnish. This varnished bias glass fabric was similar to that of Example 1 in all of its physical and electrical characteristics, possessing in addition the high heat resistance which qualified it as Class H insulation.

Instead of varnishing the fabric with a silicone varnish, a portion was coated with a conventional high temperature resistant silicone rubber such as Dow Corning Silastic or General Electric Silicone Rubber. The coating was carried out in the same manner as the conventional varnishing operation described in Example 1, using a dispersion of the silicone rubber in toluene or xylene.

Although I have herein described specific embodiments of my invention, I do not intend to limit myself solely thereto but to include all of the obvious variations and modifications within the spirit and scope of the appended claim.

I claim:

A continuous length of bias-cut woven glass fabric suitable for use in the manufacture of varnished electrical insulating material, said glass fabric carrying a sizing material amounting to 3% to 20% by weight of said fabric which bonds the yarns thereof together at their intersections, said sizing material comprising polyvinyl alcohol in combination with an interpolymer of maleic anhydride with styrene, said fabric undergoing a reduction in width of less than 3% when subjected to a pull of 1 lb. per inch on the bias at an angle of 45° to the yarns at 300° F. and undergoing an elongation from 0.5% to 20% in length when subjected to a pull of 3 lb. per inch for thirty minutes at room temperature, and adapted to be converted into electrical insulation by the application of additional coating material thereto.

References Cited in the file of this patent

UNITED STATES PATENTS

| | | |
|---|---|---|
| 2,184,326 | Thomas | Dec. 26, 1939 |
| 2,354,110 | Ford et al. | July 18, 1944 |
| 2,469,407 | Powers et al. | May 10, 1949 |
| 2,504,845 | Keyes | Apr. 12, 1950 |
| 2,590,493 | Berberich et al. | Mar. 25, 1952 |
| 2,609,350 | Spatt | Sept. 2, 1952 |
| 2,633,428 | Klug | Mar. 31, 1953 |
| 2,722,488 | Lawsberg | Nov. 1, 1955 |
| 2,816,348 | Adamik | Dec. 17, 1957 |

FOREIGN PATENTS

| | | |
|---|---|---|
| 609,367 | Great Britain | Sept. 29, 1948 |

OTHER REFERENCES

Dexter: "Silicone Rubber Emerges as a Dielectric Material," Electrical Mfg., June 1950, pages 100–103.

Warren: "Electrical Insulating Materials" (1931), Part IV, pages 453–469.